United States Patent [19]

Edmisson

[11] Patent Number: 4,625,810

[45] Date of Patent: Dec. 2, 1986

[54] TILLAGE TOOL

[75] Inventor: Delmar D. Edmisson, Guymon, Okla.

[73] Assignee: Adams Hard-Facing Company, Inc.

[21] Appl. No.: 706,128

[22] Filed: Feb. 27, 1985

[51] Int. Cl.⁴ .............................................. A01B 23/02
[52] U.S. Cl. .................................... 172/749; 172/747;
172/753
[58] Field of Search ............... 172/707, 708, 726, 749,
172/753, 699, 719, 703, 704, 702, 772, 732, 745,
730, 722, 724; 37/141 R, 141 T

[56] References Cited

U.S. PATENT DOCUMENTS

| 750,385 | 1/1904 | Naidul | 172/753 |
| 989,729 | 4/1911 | Swindle | 172/753 X |
| 2,857,853 | 10/1958 | Fitzgerald | 172/554 |
| 3,082,555 | 3/1963 | Hill | 172/753 X |
| 4,269,274 | 5/1981 | Robertson | 172/699 |
| 4,363,364 | 12/1982 | Wetmore | 172/772 |

FOREIGN PATENT DOCUMENTS 898586  4/1972  Canada .................. 172/707

Primary Examiner—Richard J. Johnson
Attorney, Agent, or Firm—Laney, Dougherty, Hessin & Beavers

[57] ABSTRACT

A tool for tilling the soil, such as a sweep, chisel or drill, which includes an elongated earth parting blade or shank having an upper end and a pointed lower end, and having a tapered, undercut dove-tailed slot extending from the pointed lower end longitudinally upwardly in the blade. A hard metal wear insert is mounted on the pointed lower end of the blade. The insert includes an overlay plate which is of complementary configuration to the blade point, and a locking key which is wedge-locked into the slot on the blade.

7 Claims, 4 Drawing Figures

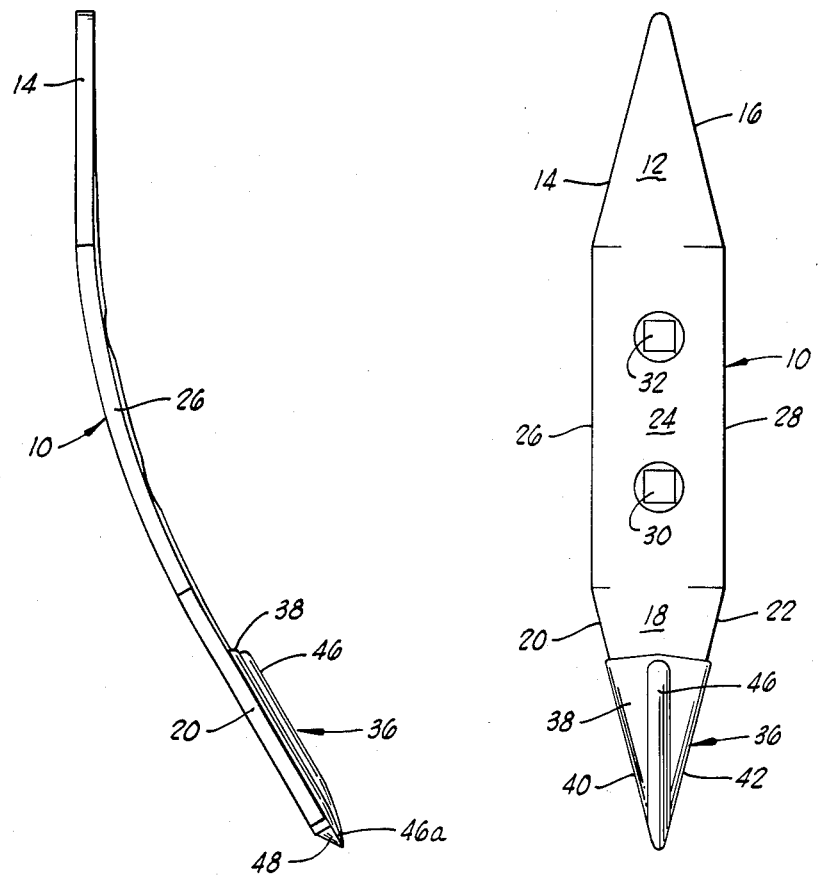
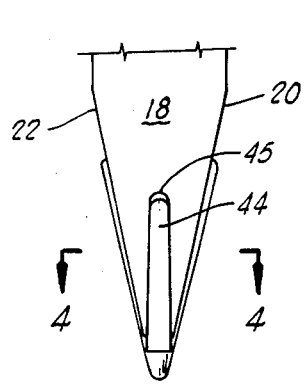
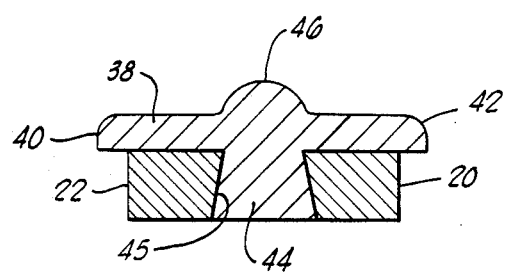

TILLAGE TOOL

FIELD OF THE INVENTION

This invention relates to tillage tools, and more particularly to sweeps, chisels, springtooth points and drills, functioning to penetrate and slice through the earth during agricultural soil preparation operations.

BACKGROUND OF THE INVENTION

The sharp pointed blades and knives used on various agricultural implements for penetrating and parting the soil during planting, cultivating and tilling undergo severe wear as the soil impacts and abrades the metallic surfaces of the tools. To counteract abrasion and extend the life of such tools, several measures have been adapted.

In one type of construction, a coating or layer of very hard metal is adhered by welding or the like to the leading edge and perhaps one or more wear surfaces of the tool. This technique, termed hard facing, extends the effective service life of the tool due to the enhanced resistance to abrasion.

In another method, a protective part is cast from a high density, high hardness metal, such as chromium carbide. This part is then welded to the leading edge or forward point of the blade, or the shank to be protected against abrasion, in a position to take the impact and abrading action of the soil, and to deflect the soil away from the softer steel of which the blade or shank is constructed. This type of assembly is typified by the structures shown in U.S. Pat. No. 4,355,589.

BRIEF DESCRIPTION OF THE PRESENT INVENTION

The present invention provides an improved tillage tool which is less costly to manufacture than other long wearing tools protected by hard metal castings, and which affords enhanced and extended protection for the shank or blade of the tool.

Broadly described, the tillage tool of the invention comprises an elongated steel earth parting blade or shank, such as a chisel or drill, which has an upper end and a pointed lower end. The shank is slotted at its pointed lower end with a tapered dove-tailed slot extending from the point upwardly along the shank. A wear resistant hard metal insert is interlocked with the shank at its pointed lower end. The insert includes an overlay plate which is of complementary configuration to the shank point, and a tapered locking key which is pressed into the tapered slot.

An important object of the invention is to provide an abrasion-resistant tillage tool which can be more quickly and less expensively manufactured than similar tools having hard metal castings welded in a protective position on the tool.

Another object of the invention is to provide a tillage tool which carries at the point or leading edge thereof, a sacrificial hard metal insert casting which has a long service life, but which can be quickly and easily removed when deterioration of the tool may dictate.

A further object of the invention is to provide a quick-attachable hard metal insert which can be quickly attached to the blade or shank of a tillage tool, and which is configured to effectively deflect soil away from the blade or shank during use of the tillage tool.

Other objects and advantages of the invention will become apparent as the following detailed description of the invention is read in conjunction with the accompanying drawings which illustrate a preferred embodiment of the invention.

BRIEF DESCRIPTION OF THE DRAWINGS

FIG. 1 is a side elevation view of a chisel constructed in accordance with the present invention.

FIG. 2 is a front elevation view of the chisel illustrated in FIG. 1.

FIG. 3 is a rear elevation view of the point disposed at the lower end of the chisel tool illustrated in FIGS. 1 and 2.

FIG. 4 is a sectional view taken along line 4—4 of FIG. 3.

DETAILED DESCRIPTION OF A PREFERRED EMBODIMENT OF THE INVENTION

Referring initially to FIG. 1 of the drawings, the chisel tillage tool there illustrated includes an elongated earth-parting blade or shank 10. The shank 10 has an upper end portion 12 which, in the illustrated embodiment, is pointed as defined by the convergence of a pair of side edges 14 and 16. The shank 10 also has a pointed lower end portion 18 which is formed by convergent side edges 20 and 22. The shank 10 includes a substantially rectangular central portion 24 having parallel side edges 26 and 28. A pair of bolt holes 30 and 32 are formed through the central portion 24 to facilitate attachment of the chisel to a supporting frog on the implement which carries the chisel, in addition to a number of other substantially identical chisels, for purposes of tilling the earth.

Attached to the pointed lower end 18 of the shank 10 is a wear-resistant hard metal insert, designated generally by reference numeral 36. The insert 36 is generally complementary in configuration to the pointed lower end portion 18 of the shank 10, and includes an overlay plate 38 which is slightly broader than the pointed lower end of the shank 10, and is pointed in shape as defined between a pair of convergent side edges 40 and 42. On its lower side, the overlay plate 38 carries a tapered locking key 44 which, as shown in FIG. 3, is pressed into a slot 45 having a shape complementary to the key for wedgingly receiving the key.

A soil-directing rib or keel element 46 is secured to the upper side of the overlay plate 38 and projects from the pointed lower end of the overlay plate along the central axis thereof to a point near the rear upper side of the overlay plate. In referring to FIG. 4 of the drawings, it will be noted that the rib 46 is substantially semicircular in transverse cross section and is there shown as formed integrally with the overlay plate 38. At its forward lower end, the rib 46 is pointed and also tapered downwardly as shown at 46a in FIGS. 1 and 2.

The tapered locking key 44 is best illustrated in FIGS. 3 and 4. The tapered locking key 44 extends along the central longitudinal axis of the overlay plate 38, and thus is positioned directly below the rib 46 as shown in FIG. 4. At its forward end, the rib 44 is slightly wider in its transverse dimension than at its rear upper end so as to be of tapered, wedge-shaped longitudinal configuration. The degree of taper which characterizes the locking key 44 is a taper of about 2°, or stated differently, about one inch of taper per foot of length. The actual size of the locking key, in a typical embodiment of the invention, will be from about one to two inches in length.

As shown in FIG. 1, the forward end of the locking key intersects a beveled protuberance 48 positioned immediately beneath the lower tip 46A of the rib 46 so that the protuberance 48 and the tapered and sharpened tip 46A together form a bullet-shaped point.

The slot 46 is formed on a taper or diminishing transverse dimension which is substantially identical to that which characterizes the locking key 44. As shown in FIG. 3, however, the slot 46 is of a length such that prior to bottoming out in the slot 46, the locking key 44 becomes wedged tightly into the slot 46 as it is forced toward the end of the slot. It will also be noted in referring to FIG. 4, that the locking key 44 and slot 45 are of mating configuration in cross section, with the locking key being dovetailed in cross-sectional configuration, and the slot 45 being undercut to accommodate this dovetail configuration. In this way, the insert 36 is locked against upward movement in the slot 45, and the overlay plate 38 is retained securely in the protective position illustrated in FIG. 4.

In a preferred embodiment of the invention, the entire hard metal insert 36 is preferably formed as a casting of very hard metal, such as chromium carbide. Thus, the tapered locking key 44, the rib 46 and the overlay plate 38 are all integrally formed by casting in the shape illustrated in the figures of the drawing.

In the use and operation of the invention, the shank 10, which may be typically made of 1080 carbon steel is sheared, punched and formed to the configuration illustrated in the drawings. The slot 45 is cut into the shank, with the described taper and undercut characterizing the slot. The hard metal insert 36, cast in the configuration illustrated, is then mounted on the pointed lower end portion of the shank 10 by driving the tapered locking key 44 into the tapered slot 45 until it is fully seated in the position illustrated in FIG. 3.

When the hard metal insert 36 is mounted on the pointed lower end portion 18 of the shank 10, and the shank is bolted by means of bolts extended through the bolt holes 30 and 32 to a frog or similar supporting plate carried by an agricultural implement, the tillage tool of the invention is ready for utilization. As the tool is pulled through the soil, oriented in substantially the vertical orientation shown in FIG. 1, the hard metal insert 36 fractures and breaks the soil as the implement carrying the tillage tool is pulled forward. As the soil is fractured, it flows over and past the point of the tool. The wear plate 38 protects the pointed lower end of the shank 10 from abrasion by the soil, and the rib 46 functions to divide or spread the soil to opposite sides of the shank 10 to the rear of the pointed lower end thereof. The rib 46 functions to protect the bolts extended through bolt holes 30 and 32 by deflecting the soil to opposite sides of the shank 10, rather than permitting the soil to crawl or climb upwardly along the upper surface of the shank.

The tapered and dovetailed configuration of the tapered locking key 44 assures that it will remain securely and firmly clamped into the receiving slot 45 during operation of the tool. It may be particularly noted that the forward end of the key 44 is protected by the bullet-shaped structure constituted by the protuberance 48 and the tip 46A of the rib 46. Further, it will also be noted that as the tool is pulled through the soil, the force acting on the lower and forward portion of the hard metal insert tends to drive the tapered locking key 44 further into the slot 45, thus always maintaining a locking force on the insert.

One of the important features of the present invention is the ability to more quickly provide a protective structure at the pointed lower end of the shank 10 than previous manufacturing methods which have been used. The hard metal insert 36 can be quickly cast and driven into position so as to position the overlay plate 38 in its protective location over the pointed lower end portion 18 of the shank 10. Much less time is required for this operation than would be required if the pointed lower end of the shank were hard-faced by welding, or if an insert were cast and then welded to the lower end of the shank.

Moreover, the hard metal insert 36 will generally last at least as long as the shank 10, and therefore, if the shank becomes inoperative or damaged, the insert can be removed by pounding on the rear upper side of the insert to drive the locking key 44 out of the slot 45. The insert can then be used on a new shank 10 if desired. In some instances, the pointed upper end portion 12 of the shank 10 will be slotted similarly to the lower end portion 18. With a double-slotted shank of this type, after the lower end portion has become worn, or if it is damaged, the entire shank can be removed and reversed so that the upper end portion becomes the lower end portion. In the course of this reversal, the hard metal insert 36 is removed from the lower end portion and is locked in place, in the manner described, by interengagement between the locking key and the slot formed in the now-reversed upper end portion.

Although a preferred embodiment of the invention has been herein described in order to illustrate the basic principles of the invention, it will be understood that various changes and innovations can be effected in the structure here shown and discussed without departing from a reliance on such principles. All such innovations and deviations which continue to rely on these basic principles are therefore deemed to be circumscribed by the spirit and scope of the invention except as the same are necessarily limited by the appended claims and reasonable equivalents thereof.

What is claimed is:

1. A tillage tool comprising:
   an elongated shank having an upper end and a pointed lower end portion, said pointed lower end portion having an elongated, tapered undercut, dove-tailed slot extending from the point at the lower end of the shank upwardly in the shank and tapering by diminishing in width from a location adjacent the point at the lower end of the shank as such slot progresses upwardly and rearwardly in the shank; and
   a hard metal wear insert mounted on the pointed lower end portion of the shank, said insert being substantially complementary in configuration to said pointed lower end portion and including an elongated locking key wedgingly engaged by said slot, said insert further comprising:
   an overlay plate protectively covering the upper surface of the pointed lower end portion of said shank, and having said locking key carried on the lower side thereof, and having a point at the forward lower end thereof; and
   a protuberant rib carried centrally on the upper side of said overlay plate and extending rearwardly and upwardly from the point at the forward lower end of said overlay plate, and disposed in substantially vertical alignment with said locking key, whereby the insert can be removed from engagement with said slot by impacting the upper rear end of said protuberant rib to transfer removing force to said locking rib and thereby disengage said locking rib from said tapered, undercut dove-tailed slot.

2. A tillage tool as defined in claim 1 wherein said slot is longer than said locking key whereby, as said key and said slot become worn in the course of use of said tillage tool, said elongated locking key will continue to be wedgingly engaged by said slot by movement deeper into said slot and toward the end thereof having the relatively narrowest width.

3. A tillage tool as defined in claim 1 wherein said rib is semicircular in cross-sectional configuration.

4. A tillage tool as defined in claim 1 wherein said rib is pointed and tapered downwardly at its forward lower end, and wherein said insert further includes a beveled protuberance ahead of said locking key and forming a bullet shaped point with said forward lower end of said rib.

5. A tillage tool as defined in claim 1 wherein said hard metal insert is a casting.

6. A tillage tool as defined in claim 5 wherein said rib is semicircular in cross-sectional configuration.

7. A tillage tool as defined in claim 6 wherein said rib is pointed and tapered downwardly at its forward lower end, and wherein said insert further includes a beveled protuberance ahead of said locking key and forming a bullet shaped point with said forward lower end of said rib.

* * * * *